Sept. 15, 1964 A. P. SCHOLTZ ETAL 3,148,648
CAN MAKING APPARATUS AND METHOD
Filed April 28, 1961 2 Sheets-Sheet 2
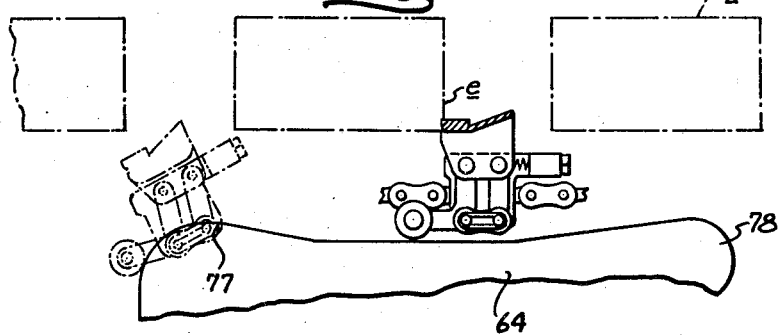
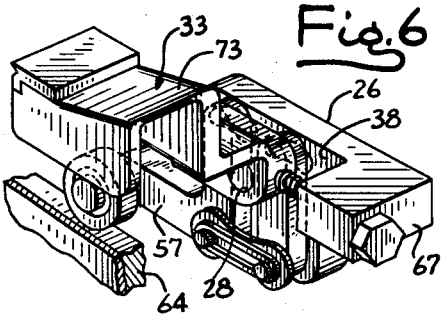
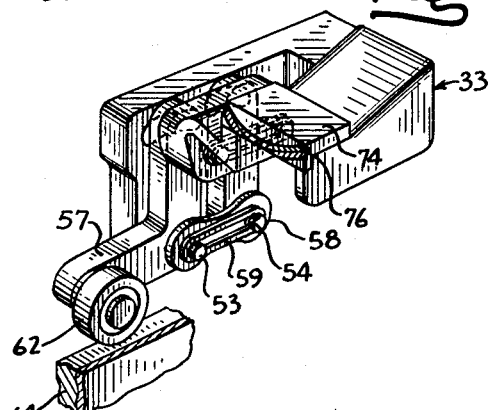
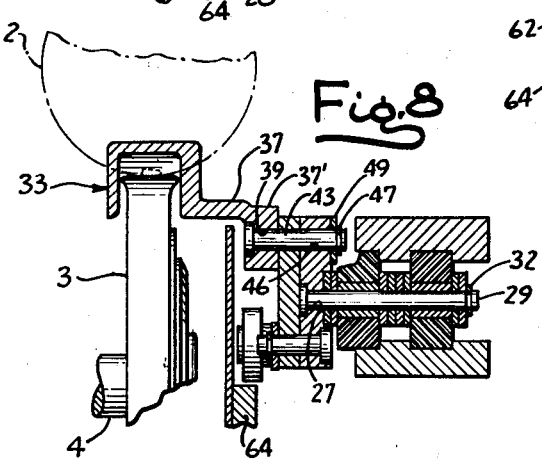
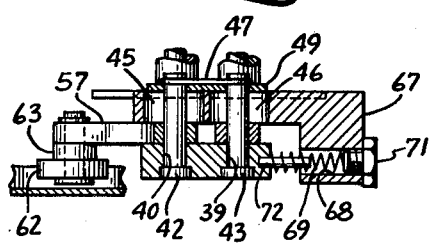
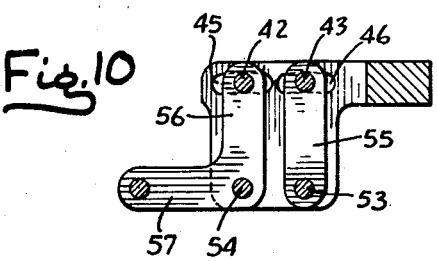
INVENTORS
ARTHUR P. SCHOLTZ
ARTHUR M. KOBLISH
BY
Morris Spector
ATTY.

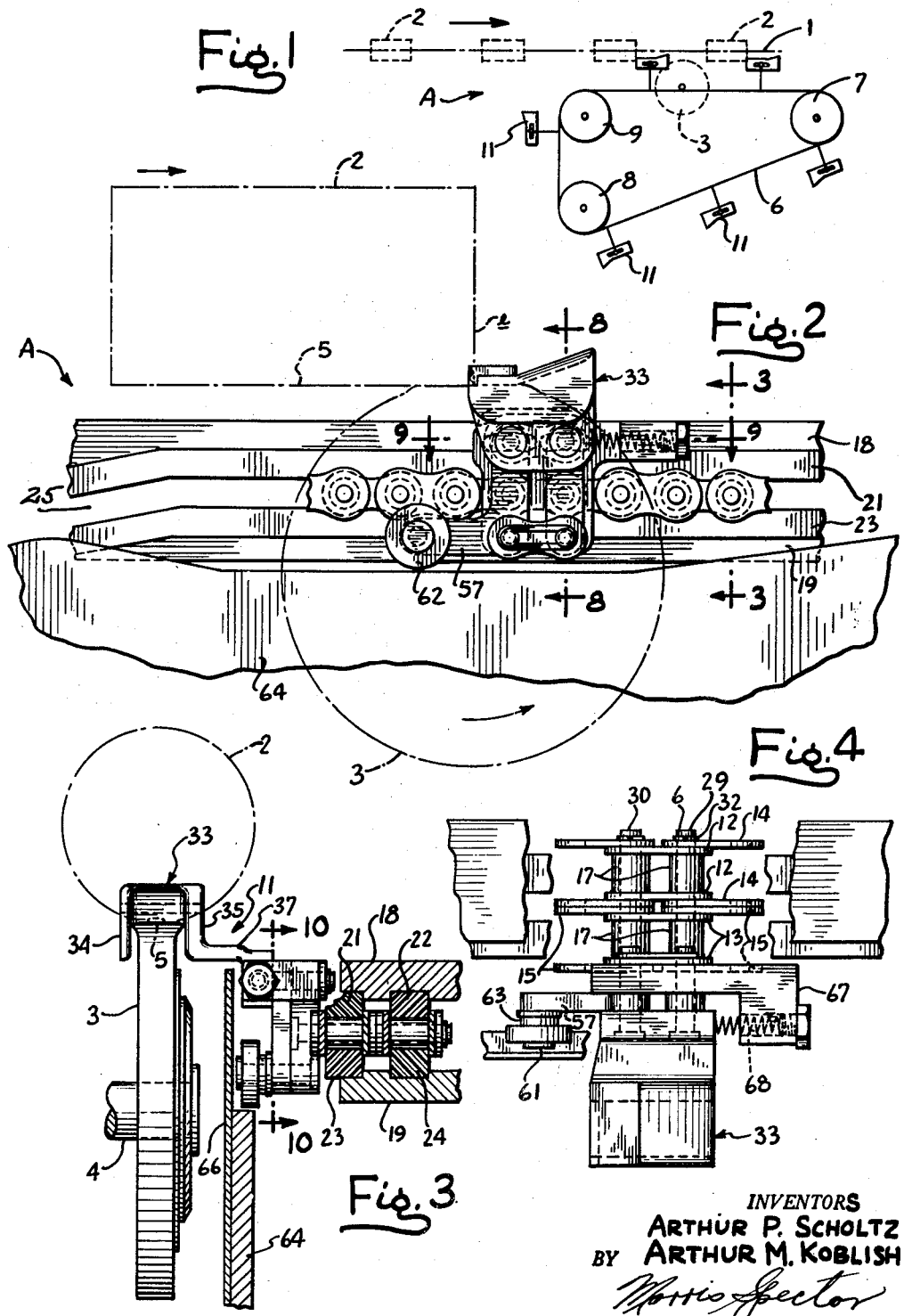

United States Patent Office 3,148,648
Patented Sept. 15, 1964

3,148,648
CAN MAKING APPARATUS AND METHOD
Arthur P. Scholtz and Arthur M. Koblish, Melrose Park, Ill., assignors to National Can Corporation, Chicago, Ill., a corporation of Delaware
Filed Apr. 28, 1961, Ser. No. 106,370
7 Claims. (Cl. 113—97)

This invention relates to improvements in can making, and more particularly, to a method and apparatus for preventing splashing of solder into the interior of can bodies during manufacture thereof.

In the manufacture of cans, the can bodies are usually constructed of a rectangular sheet of tin plate or the like which is formed into a cylinder and the abutted or overlapped edges are then solder-sealed together to form a longitudinally extending seam. After the soldering operation an yexcess of solder deposited on the seam is removed as by passing the freshly soldered seams of the can bodies over a rotary cloth wiper. When this is done, it has been found that the wiper sometimes throws small fragments of solder into the interior of the open cylindrical can body. It has also been found that in passing the can bodies over the cloth wiper the raw edge at the forward end of the can body tends to cut the wiper.

It is therefore, an object of the present invention to provide a method and apparatus which will prevent throwing of solder from the solder wiper into the can body.

It is also an object of the present invention to provide a method and apparatus of the type stated in which cutting of the wiper by the can body as the latter passes into contact therewith is prevented or substantially reduced, thereby increasing the useful life of the wiper.

In accordance with the preferred embodiment of the present invention a series of moving solder splash guards are provided and moved in synchronism with the moving can bodies of a can line and arranged so that successive guards are moved into guarding relationship with respect to the advancing ends of successive freshly soldered can bodies in the can line following the body soldering operation. Each advancing can body is engaged by a splash guard before it is engaged by the conventional solder wiper and guards against the throwing of globules of solder into the can body by the following solder-wiping operation. It is one of the objects of the present invention to provide an arrangement that permits a limited amount of relative motion between the moving can body and the synchronously moving splash guard as the two are being brought together, to allow for dimensional deviations due to wear or inaccuracies in the machine. Spring means are provided to maintain the splash guards and the ends of the advancing can bodies in engagement.

It is a still further object of the present invention to provide an arrangement which will prevent the cutting or wearing action that normally takes place as the advancing edge of the can body comes into contact with the rotating solder wiper. In the preferred embodiment of this invention this function is served by the solder splash guard. The splash guard is constructed in such a manner as to depress the wiper immediately in advance of the foreward edge of the advancing can body to prevent cutting of the wiper by the open front end of the can body.

In the machine of the present invention the splash guards are carried by an endless sprocket chain eccentrically thereof. This may tend to cause the chain to skew. This is undesirable. It is therefore a still further object of this invention to provide an arrangement for holding an eccentrically loaded sprocket chain against skewing or shifting from its desired angular position at least in certain portions of its path of travel.

The attainment of the above and further objects of the present invention will be apparent from the following specification taken in conjunction with the accompanying drawing forming a part thereof.

In the drawing:

FIG. 1 is a diagrammatic view of apparatus embodying the present invention;

FIG. 2 is a fragmentary front elevational view of a portion of the apparatus;

FIG. 3 is a fragmentary sectional view taken along lines 3—3 of FIG. 2;

FIG. 4 is a fragmentary top plan view, partially broken away, of the portion of the apparatus shown in FIG. 3;

FIG. 5 is a fragmentary front elevational view, partially in section and on a reduced scale, of the apparatus illustrated in FIG. 2 and showing the manner in which the splash guards are advanced into the can line;

FIGS. 6 and 7 are fragmentary perspective views of the splash guard assemblies which form a part of the present invention;

FIGS. 8 and 9 are fragmentary sectional views taken along lines 8—8 and 9—9 respectively of FIG. 2; and FIG. 10 is a fragmentary sectional view taken along line 10—10 of FIG. 3.

Referring now in more detail and by reference characters to the drawing, which illustrates a preferred embodiment of the present invention, A designates a part of a can line of a can making apparatus immediately after the can bodies on the line have passed the soldering station where the longitudinally extending solder joint is formed and as the cans are passing through the "wiping" stage where excess solder is being wiped from said joint. The line includes a conventional can body conveyor 1 firmly holding in cylindrical form and advancing a plurality of axially aligned, open ended, can bodies 2 from the soldering station toward a conventional rotatable cylindrical cloth wiper wheel 3, which is a buffer, on a shaft 4. The can bodies 2 have freshly soldered longitudinally extending lap seams 5 which have just been soldered in a manner known in the art. Since the conveyor 1 is conventional in the art, it is merely diagrammatically represented by the broken line *l*. Provided for cooperation with the cans on the conveyor 1 is an endless double roller sprocket chain 6 which is trained around a drive sprocket wheel 7 and two idler sprocket wheels 8, 9 for continuous clockwise movement in the direction indicated by the arrow in FIG. 1. A series of spaced splash guard assemblies 11 are mounted upon chain 6 for interposition in the line of cans 2 in timed relation therewith, as will be presently more fully described.

The double roller sprocket chain 6 conventionally includes a series of inside plates 12—12 and 13—13 and outer plates 14—14 and 15—15 and chain rollers 17 between the plates 12—12 and between the plates 13—13. The run of the roller chain 6 which extends between the sprocket wheels 7 and 9 is movable along in upper and lower tracks 18, 19 which extend between the sprocket wheels 7, 9. The tracks 18, 19 include track gibs 21, 22, 23, 24. The spacing of the gibs 21, 23 and that of the gibs 22, 24 is substantially equal to the outer diameter of the chain rollers 17. Furthermore, the gibs 21, 22, 23, 24 each have a width which is substantially the same as the distance between the respective series of inside plates 12—12 and 13—13. Therefore, as the sprocket chain 6 is driven by the sprocket wheel 7 the run of the chain between the sprocket wheels 9, 7 is guided by the gibs 21, 22, 23, 24 which, in effect, form a chute, and the chain 6 is prevented from moving in a path other than that formed by tracks 18, 19. The path is so shaped and located as to properly orient the advancing of each splash guard 11 as it comes into the path of the cans in the line, as indicated at 25, so that the guards clear the cans.

As seen by reference to FIGS. 3, 4, and 8, the splash guard assembly 11 is carried by and projects laterally to one side of the roller chain 6. The splash guard assembly 11 includes a chain supported plate 26 having two longitudinally spaced bores 27, 28 for receiving extra long sprocket chain pins 29, 30, each of which has a head at one end and project axially through the chain rollers 17 and chain plates and secure the plates 26 to the chain 6. The pins 29–30 are longer than those sprocket link pins that are at those locations of the sprocket chain that do not carry a splash guard. The opposite end of chain pins 29, 30 is prevented from axial shifting by a snap ring 32. Each chain support plate 26 carries a U-shaped shield 33. Each shield 33 has depending legs 34, 35 which are spaced apart an amount greater than the width of the wiper wheel 3. A flange 37 extends laterally outwardly from the lower end of the leg 35 and terminates in a downwardly extending flange 37'. The flange 37' has spaced holes 39, 40 for receiving shield-supporting pins 42, 43 that are mounted at the upper ends of links 56, 55 and guided in arcuate slots 45, 46 which are formed in the chain support plate 26 at the upper end thereof. Retraction of the pins 42, 43 is prevented by snap ring 47. The pins 42, 43 are joined by a plate 49 which is mounted thereon between the snap ring 47 and support plate 26.

Projecting through the lower ends of the support plates 26 are link pins 53, 54 for rockably supporting spaced parallel links 55, 56 on the support plate 26. The upper ends of the links 55, 56 lie between the flange 37' and the face 38 of support plate 26 and are perforated for receiving the pins 42, 43. A chain plate 58 is mounted on and joins the pins 53, 54 and a snap ring 59 retains the pins 53, 54 in mounted position. The link 56 has a crank arm 57 projecting rearwardly of the chain support plate 26. The crank arm, through a cam-follower pin 61, rotatably supports a ball-bearing cam follower 62. A spacer 63 may be mounted on the pin 61 between the link 56 and follower 62. The cam follower 62 rides on the edge of a cam plate 64 which is located between the chain support plate 26 and wiper 3, for purposes presently more fully appearing. In the region of the wiper 3 a splash plate 66 is mounted on the cam plate 64.

The front end of the support plate 26 has a laterally projecting block portion 67 formed with a bore 68 for receiving a coil spring 69. One end of the coil spring 69 abuts a spring-retainer screw 71 which is threaded into the front end of the bore 68. The other end of the spring 69 abuts the forward face of the flange 37 of the shield 33. A spring guide pin 72 mounted in the flange 37 projects into the spring 69 and provides a guide therefor. The spring 69 biases the shield 33 rearwardly and urges the cam follower 62 toward engagement with the cam plate 64.

The top or bight 73 of the shield 33 is upwardly inclined at its forward part and at its rearward part has a block 74 which terminates at the rear edge of the shield 33. Formed in the rearwardly presented surface of the block 74 is an arcuate groove 76 which is V-shaped in cross section and is adapted to receive the bottom portion of the forward edge $e$ of the open cylindrical can body 2 as shown in FIGS. 2 and 5. The radius of the arcuate groove 76 is the same as that of the can body 2 so that the bottom forward edge $e$ of the can body 2 fits substantially conformably in the groove 76.

In operation, the can bodies 2 are advanced toward the rotating wiper 3. At the same time the splash guard assemblies 11 are being interposed in the can line between cans, each for contact with the forward edge of one can body. As one of the splash guard assemblies 11 moves over the rear lobe 77 (FIG. 5) of the cam plate 64, the cam follower 62 is lifted, thereby rocking the links 55, 56 forwardly and shifting the shield 33 forwardly in opposition to the spring 69 so that the groove 76 is forwardly spaced from the can edge $e$ when the shield 33 gets into the can line. Further movement of the chain 6 will carry the assembly 11 past the cam lobe 77 whereupon the spring 69 will urge the shield 33 rearwardly until the groove 76 contacts the can and the forward edge $e$ becomes seated in the groove 76. Thus, the cooperation of the spring 69 and cam plate 64 advance the movement of the shield 33 as it enters the can line and then retards its movement to enable the forward edge $e$ of the can body 2 to seat into the groove 76 before the shield 33 and can body 2 reach the wiper 3. Small variations in axial spacing of the can bodies 2 in the can line may occur, but the spring 69 will retard the shield 33 enough to make contact with the can body 2.

As the shield 33 which is in front of each can reaches the wiper 3, the forward part of the bight 73 will pass thereabove, while the part of the bight below the block 74 will gradually depress and flatten the periphery of the wiper 3 as shown in FIG. 2. When the can body 2 contacts the wiper, the can body 2 will move thereacross to enable the wiper 3 to remove the excess solder from the seam 5. By depressing the wiper 3 in advance of its contact with the can body, the raw forward edge $e$ does not cut into the wiper 3. The shield 33 will deflect any solder thrown from the wiper 3 and prevent solder particles from entering the can body 2 through its open front end.

When the can body 2 has moved past the wiper 3, the cam follower 62 will ride on the cam lobe 78, rocking the links 55, 56 forwardly to advance the shield 33 out of contact with the can body. The shield 33 will then travel around the sprocket 7 and away from the can body. Each of the remaining assemblies 11 operate in the manner just described so that a shield 33 is placed in front of each can body.

The assembly 11 constitutes an eccentric load on the roller chain 6, but the track gibs 21, 22, 23, 24 maintain contact with the double chain 6 substantially throughout the run of the chain between the sprockets 9, 7. Therefore, the chain 6 is kept in a fixed path as the assemblies 11 move into the can line and are advanced with the can bodies over and past the wiper 3. This assists in the provision of proper location of the shield groove 76 as the shield 33 is retarded into contact with the can body.

From the above description it is apparent that the present invention will prevent solder which is thrown or scooped off of the solder joint of the can body by the solder wiper from lodging inside a can. The splash guard assemblies are moved in synchronism with the movement of the cans in the can line but they are advanced rapidly by the cam as they get into the can line and then are retarded into engagement with the leading face of the approaching can body so that there is no space between the can body and the splash guard. The grooved profile 76 of the rear of the shield 33 matches the curvature of the can body so that scooping of the solder wiper roll 3 does not result. The spring loading of the shield 33 automaticaly takes up any variations in the sprocket chain or in the rest of the machinery.

In compliance with the requirement of the patent statutes, we have herein shown and described the preferred embodiment of the present invention. It is however, to be understood that the invention is not limited to the precise construction herein shown, the same being merely illustrative of the principle of the invention. What is considered new and sought to be secured by Letters Patent is:

1. Can making apparatus comprising means for wiping excess solder from the seams of a plurality of can bodies, means for moving the can bodies successively into contact with the wiping means, shielding means for preventing solder wiped from the can bodies from entering the interior of the can bodies, driving means for successively positioning the shielding means between the wiping means and can bodies as the can bodies approach and contact the wiping means, and a mechanical connection for providing relative movement between the shielding means and its driving means, said mechanical connection comprising a support connected to the driving means, link means pivotally connected to the support and pivotally connected to the shielding means remote from the pivotal connection to the support, the support having arcuate slots for guiding the link means, and spring means interposed between the support and shielding means for biasing the shielding means toward the can bodies as they engage; said shielding means also including means depressing the wiping means in advance of contact thereof by the can bodies.

2. Can making apparatus comprising means for wiping excess solder from the seams of can bodies, means for moving the can bodies successively into contact with the wiping means, shielding means for preventing solder wiped from the can bodies from entering the interior of the can bodies and having means for engagement with the forward edge of a can body, driving means for carrying the shielding means successively into the path of movement of each can body for engagement with the forward edge of the can body prior to contact with the wiping means and for carrying the shielding means out of said path after contact of the can body with the wiping means, said driving means including a flexible chain having support means upon which the shielding means is mounted laterally to one side of the longitudinal center line of the chain, track-forming means on opposite sides of said center line and forming a path of movement for a run of said chain, and a mechanical connection for providing relative movement between the support means and shielding means; said mechanical connection including link means pivotally connected to the shielding means and support means, and spring means interposed between the support means and shielding means for biasing the shielding means toward the can bodies as they engage.

3. Means for wiping the excess solder from freshly soldered seams of can bodies in a can making line that includes a solder wiper and means for moving the can bodies successively into contact with the wiper, shielding means for preventing solder wiped from the can bodies from entering the interior of the can bodies, said shielding means having an arcuate groove for receiving the forward edge of a can body, driving means for carrying the shielding means successively into the path of movement of each can body for engagement with the forward edge of the can body prior to contact of the can body with the wiping means and for carrying the shield means out of said path after contact of the can body with the wiping means, means joining the shielding means and driving means, said joining means including a movable connection between the shielding means and the driving means for enabling movement of the shield means toward and away from said forward edge when the shielding means is in said path of movement, and spring means for biasing the shielding means into engagement with said forward edge.

4. Apparatus according to claim 3 wherein the shielding means includes a U-shaped part adapted to overlie and embrace the wiping means and a part adjacent to the forward edge of the can body for depressing the wiping means prior to contact thereof by the can body.

5. Apparatus according to claim 3 wherein the driving means comprises a flexible chain, the shielding means is laterally offset to one side of the longitudinal center line of the chain, and means on the opposite side of the longitudinal center line of the chain for supporting the chain against sidewise wobbling.

6. Can making apparatus comprising means for wiping excess solder from the seams of can bodies, means for moving the can bodies successively into contact with the wiping means, shielding means for preventing solder wiped from the can bodies from entering the interior of the can bodies, said shielding means including a U-shaped part adapted to overlie and embrace the wiping means and a part adjacent to the forward end of the can body for depressing the wiping means prior to contact thereof by the can body, said shielding means also having an arcuate groove extending transversely thereof for receiving a part of said forward end of the can body, flexible driving means for successively positioning the shielding means between the wiping means and can bodies as the can bodies approach and contact the wiping means, said driving means having support means attached thereto, means including link means pivotally connected to the support means and drivingly connected to the shielding means and support means and mounting the shielding means laterally to one side of the flexible drive means, spring means in operative connection between the support means and shielding means for biasing the shielding means into engagement with said forward end of the can body, said link means having a cam follower, and a cam track for actuating the follower to shift the shielding means in opposition to said spring means, said support means having slot means for guiding the movement of the shielding means relative to the support means.

7. Can making apparatus comprising means for wiping excess solder from the seams of can bodies, means for moving the can bodies successively into contact with the wiping means, shielding means for preventing solder wiped from the can bodies from entering the interior of the can bodies, said shielding means including a U-shaped part adapted to overlie and embrace the wiping means and a part adjacent to the forward end of the can body for depressing the wiping means prior to contact thereof by the can body, said shielding means also having an arcuate groove extending transversely thereof for receiving a part of said forward end of the can body, flexible driving means having a longitudinal center line and successively positioning the shielding means between the wiping means and can bodies as the can bodies approach and contact the wiping means, said driving means having support means attached thereto, means including link means pivotally connected to the support means and drivingly connected to the shielding means and support means and mounting the shielding means laterally to one side of the longitudinal center line of the flexible drive means, spring means in operative connection between the support means and shielding means for biasing the shielding means into engagement with said forward end of the can body, said link means having a cam follower, a cam track for actuating the follower to shift the shielding means in opposition to said spring means, and means forming adjacent parallel trackways engaging the flexible drive means on opposite sides of said longitudinal center line and holding said drive means from skewing.

References Cited in the file of this patent

UNITED STATES PATENTS

| 480,256 | Foote | Aug. 9, 1892 |
| 1,423,098 | Ferguson | July 18, 1922 |
| 1,749,279 | Forstad et al. | Mar. 4, 1930 |
| 1,956,344 | Coyle | Apr. 24, 1934 |
| 2,727,482 | Johnson | Dec. 20, 1955 |
| 2,881,729 | Geertsen | Apr. 14, 1959 |

FOREIGN PATENTS

| 499,131 | Canada | Jan. 12, 1954 |